United States Patent
Roesch et al.

(10) Patent No.: US 9,796,393 B2
(45) Date of Patent: Oct. 24, 2017

(54) METHOD AND REGULATING DEVICE FOR REGULATING A HYBRID DRIVE OF A HYBRID ELECTRIC MOTOR VEHICLE

(71) Applicant: Robert Bosch GmbH, Stuttgart (DE)

(72) Inventors: Alexander Roesch, Reutlingen (DE); Joerg Kieser, Bietigheim-Bissingen (DE); Alexander Maass, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 86 days.

(21) Appl. No.: 14/388,835

(22) PCT Filed: Feb. 8, 2013

(86) PCT No.: PCT/EP2013/052566
§ 371 (c)(1),
(2) Date: Sep. 29, 2014

(87) PCT Pub. No.: WO2013/143742
PCT Pub. Date: Oct. 3, 2013

(65) Prior Publication Data
US 2015/0051774 A1    Feb. 19, 2015

(30) Foreign Application Priority Data
Mar. 27, 2012  (DE) .................. 10 2012 204 849

(51) Int. Cl.
*B60W 50/08*     (2012.01)
*B60W 10/06*     (2006.01)
(Continued)

(52) U.S. Cl.
CPC ........... *B60W 50/082* (2013.01); *B60K 6/448* (2013.01); *B60K 6/52* (2013.01); *B60W 10/06* (2013.01);
(Continued)

(58) Field of Classification Search
CPC ....... B60K 6/448; B60K 6/52; B60W 50/082; B60W 10/06; B60W 10/08; B60W 20/00;
(Continued)

(56) References Cited

U.S. PATENT DOCUMENTS 6,424,157 B1 *   7/2002   Gollomp .............. G01R 31/006
                                                    320/132
2004/0040375 A1 *  3/2004   Kadota ..................... B60K 6/00
                                                    73/115.02
(Continued)

FOREIGN PATENT DOCUMENTS

CN    1420034 A     5/2003
CN    102310760 A   1/2012
(Continued)

OTHER PUBLICATIONS

International Search Report for Application No. PCT/EP2013/052566 dated Feb. 26, 2014 (English Translation, 3 pages).

*Primary Examiner* — Courtney Heinle
(74) *Attorney, Agent, or Firm* — Michael Best & Friedrich LLP

(57) ABSTRACT

The invention relates to a method for regulating a hybrid drive of a hybrid electric motor vehicle which has an electric energy store (HV), said method having the following steps: determining (S1) criteria for engaging the electric drive (EM1; EM1, EM2) and/or the internal combustion engine (VM) using an adjustable drive mode, wherein a part of a battery capacity of the electric energy store (HV) is reserved using a variable setting; and regulating (S2) the engagement of the electric drive (EM1; EM1, EM2) and/or the internal combustion engine (VM) of the hybrid electric motor vehicle using the determined criteria and the variable setting.

11 Claims, 2 Drawing Sheets

(51) Int. Cl.
  *B60W 20/00* (2016.01)
  *B60K 6/52* (2007.10)
  *B60K 6/448* (2007.10)
  *B60W 10/26* (2006.01)
  *B60W 10/08* (2006.01)

(52) U.S. Cl.
  CPC ............ *B60W 10/08* (2013.01); *B60W 10/26* (2013.01); *B60W 20/00* (2013.01); *B60W 2540/04* (2013.01); *B60W 2710/244* (2013.01); *Y02T 10/6243* (2013.01); *Y02T 10/6265* (2013.01); *Y02T 10/6286* (2013.01)

(58) Field of Classification Search
  CPC ............ B60W 10/26; B60W 2540/04; B60W 2710/244; Y02T 10/6286; Y02T 10/6265; Y02T 10/6243
  USPC .......................................................... 701/22
  See application file for complete search history.

(56) References Cited

U.S. PATENT DOCUMENTS

| | | | | |
|---|---|---|---|---|
| 2007/0205030 | A1* | 9/2007 | Shibata | B60K 6/365 180/65.28 |
| 2008/0318730 | A1 | 12/2008 | Endo | |
| 2009/0024262 | A1* | 1/2009 | Amamiya | B60K 6/445 701/22 |
| 2009/0105038 | A1* | 4/2009 | Weiss | B60K 6/48 477/5 |
| 2010/0049389 | A1* | 2/2010 | Ando | B60K 6/445 701/22 |
| 2011/0166733 | A1* | 7/2011 | Yu | B60K 6/445 701/22 |
| 2012/0065828 | A1* | 3/2012 | Kato | B60K 6/445 701/22 |
| 2012/0072066 | A1* | 3/2012 | Kato | B60K 6/365 701/22 |
| 2012/0143425 | A1* | 6/2012 | Yamamoto | B60K 6/442 701/22 |
| 2013/0030634 | A1* | 1/2013 | Endo | B60K 6/46 701/22 |
| 2013/0049943 | A1* | 2/2013 | Wendt | B60W 50/14 340/439 |
| 2013/0320989 | A1* | 12/2013 | Inoue | G01R 31/3624 324/427 |
| 2015/0236523 | A1* | 8/2015 | Takano | H02J 7/007 320/107 |

FOREIGN PATENT DOCUMENTS

| | | |
|---|---|---|
| EP | 1393951 | 3/2004 |
| JP | 2002152909 | 5/2002 |
| JP | 2002233006 A | 8/2002 |
| JP | 2005110495 | 4/2005 |
| JP | 2005267966 | 9/2005 |
| JP | 2005304205 A | 10/2005 |
| JP | 2005349916 A | 12/2005 |
| JP | 2006248466 A | 9/2006 |
| JP | 2009286374 | 12/2009 |
| JP | 2011098663 | 5/2011 |
| WO | 2007074367 | 7/2007 |
| WO | 2011125184 | 10/2011 |

* cited by examiner

METHOD AND REGULATING DEVICE FOR REGULATING A HYBRID DRIVE OF A HYBRID ELECTRIC MOTOR VEHICLE

BACKGROUND OF THE INVENTION

The invention relates to a method and a regulating device for regulating a hybrid drive of a hybrid electric motor vehicle.

DE 10 2006 008 640 A1 describes a hybrid vehicle having two drive assemblies. The hybrid vehicle described in said document has an internal combustion engine as a first drive assembly, and the hybrid vehicle has an electric machine as the second drive assembly. In the method described in said document the internal combustion engine is started from the operating mode of the hybrid drive by means of a starterless direct start.

As a result, it is possible with the method described in said document to move with stationary internal combustion engine and solely by means of the electric drive of the hybrid vehicle.

SUMMARY OF THE INVENTION

The invention provides a method for regulating a hybrid drive of a hybrid electric motor vehicle and a corresponding regulating device.

The present invention provides according to one aspect, a method for regulating a hybrid drive of a hybrid electric motor vehicle which has an electric energy store, having the steps: defining criteria for actuating the electric drive and/or the internal combustion engine on the basis of an adjustable driving mode, wherein a portion of a battery capacity of the electric energy store is reserved by means of a variable setting; and regulating the actuation of the electric drive and/or of the internal combustion engine of the hybrid electric motor vehicle by means of the defined criteria and by means of the variable setting.

In addition, the present invention provides according to one aspect a regulating device for regulating a hybrid drive of a hybrid electric motor vehicle which has an electric energy store, wherein the regulating device is configured to define criteria for actuating the electric drive and/or the internal combustion engine on the basis of an adjustable driving mode, wherein a portion of a battery capacity of the electric energy store is reserved by means of a variable setting; and to regulate the actuation of the electric drive and/or of the internal combustion engine of the hybrid electric motor vehicle by means of the defined criteria and by means of the variable setting.

The idea on which the present invention is based is to adapt better the availability of an electric drive assistance in a hybrid electric motor vehicle.

The following advantages can be implemented by means of the present invention.

The invention permits, in the case of an axle hybrid, i.e. a hybrid electric motor vehicle in which in each case at least one drive assembly acts on in each case one driven vehicle axle, the use of the all-wheel drive to be better adapted to a predefined request.

A temporary all-wheel drive with acceptable use times can advantageously be made available by means of the concept on which the present invention is based, without a second electric drive unit which has to be operated as a generator being absolutely necessary. The invention permits, according to demand, a maximum drive power at those wheels which are coupled only to an electric drive or electric drives.

In addition, if two electric drive units are used, the present invention permits temporary all-wheel drive without making available a generator mode of the electric drive units. An increased drive power is therefore made possible on the basis of the drive torque of all the drive assemblies of the hybrid electric motor vehicle.

The invention provides the driver with various registerable driving modes which permit drive to be provided to the hybrid electric motor vehicle in accordance with the given requirements. In this context, in the case of an axle hybrid having an e-machine, the all-wheel drive of the hybrid electric motor vehicle is to be made available as far as possible in accordance with demand.

According to one embodiment, the electric drive of the hybrid electric motor vehicle is configured as an actuable electric drive of the hybrid electric motor vehicle which permits all-wheel drive of the hybrid electric motor vehicle. This permits an adapted driving style of the hybrid electric motor vehicle.

According to a further embodiment, a demand, determined by a sensor device, for an increase in the traction of the hybrid electric motor vehicle is used as one of the criteria for the actuation of the electric drive and/or of the internal combustion engine.

According to a further embodiment, the adjustable driving mode is selected from a plurality of driving modes by the driver.

According to a further embodiment, a percentage of zero percent or of up to 30 percent or of up to 70 percent or of up to 100 percent of the battery capacity of the electric energy store is used as the portion of the battery capacity of the electric energy store which is reserved for a motor mode of a first electric drive unit and/or of a second electric drive unit. This advantageously permits the availability period of the all-wheel drive of the hybrid electric motor vehicle to be influenced in accordance with the given requirements.

According to a further embodiment, the adjustable driving mode forcibly brings about a motor mode of a first electric drive unit. This permits the driving behavior of the hybrid electric motor vehicle to be improved.

According to a further embodiment, availability of all-wheel drive is indicated on the basis of the portion of the battery capacity of the electric energy store which is reserved for the electric drive.

According to a further embodiment, in addition to the availability an anticipated availability period of the all-wheel drive is also displayed.

According to a further embodiment, the portion of the battery capacity of the electric energy store which is to be reserved is determined on the basis of sensor data.

According to a further embodiment, the electric drive has only one electric drive unit.

BRIEF DESCRIPTION OF THE DRAWINGS

Further features and advantages of the present invention are explained below on the basis of embodiments and with reference to the figures, in which.

DETAILED DESCRIPTION

In the figures, identical reference symbols denote identical or functionally identical elements unless stated otherwise.

The appended drawings are intended to permit better understanding of the embodiments of the invention. They illustrate embodiments and together with the description they serve to explain principles and concepts of the invention. Other embodiments and many of the specified advantages are apparent from the drawings. The elements of the drawings are not necessarily shown true to scale with respect to one another.

The term "hybrid electric motor vehicle" is to be understood below as referring to a hybrid electric motor vehicle or an electric vehicle which is driven by at least one electric motor and a further energy converter and draws the energy from an operating fuel tank and a storage device for electrical energy.

This may comprise, for example, a full hybrid vehicle, a plug-in hybrid vehicle or some other vehicle with hybrid drive.

The term "electric drive" below refers to an electric drive assistance means such as, for example, an additional electric drive with one or more electric motors for assisting the drive torque of an internal combustion engine.

Figure 1:
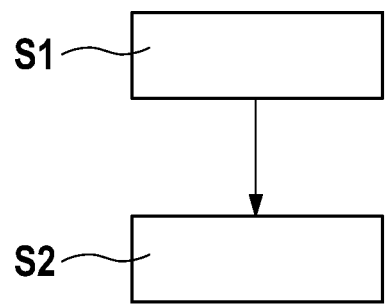
FIG. 1 shows an illustration of a flow chart of a method for regulating a hybrid drive of a hybrid electric motor vehicle according to a first embodiment of the present invention.

FIG. 1 shows an illustration of a flow chart of a method for regulating a hybrid drive of a hybrid electric motor vehicle according to a first embodiment of the present invention.

In a first step of the method, criteria for the actuation of an electric drive EM1 and/or of the internal combustion engine VM are defined S1 on the basis of an adjustable driving mode, wherein a portion of a battery capacity of an electric energy store HV for the electric drive is reserved by means of a variable setting.

In a second step of the method, the actuation of the electric drive EM1 and/or of the internal combustion engine VM of the hybrid electric motor vehicle is regulated S2 by means of the defined criteria and by means of the variable setting.

For example, an increased demand for traction for the hybrid electric motor vehicle is used as one of the criteria for the actuation of the electric drive EM1 and/or of the internal combustion engine VM, wherein the internal combustion engine VM and the electric drive EM1 are switched on in order to drive the hybrid electric motor vehicle.

For example, an increased demand for the availability period of the all-wheel drive of the hybrid electric motor vehicle is used as one of the criteria for the actuation of the electric drive EM1 and/or of the internal combustion engine VM, wherein the internal combustion engine VM is switched on in order to drive the hybrid electric motor vehicle and the electric drive EM1 is operated as a generator.

For example, operation of the hybrid electric motor vehicle which is optimum in terms of fuel is used as one of the criteria for the actuation of the electric drive EM1 and/or of the internal combustion engine VM, wherein the internal combustion engine VM is switched off and the electric drive EM1 is operated as a motor or generator.

For example, a first driving mode "Eco", in which the entire battery capacity of the electric energy store HV is used for selecting the operating mode of the drive of the hybrid electric motor vehicle in a way which is optimum in terms of fuel, is used as adjustable driving mode.

In this driving mode, in some cases, for example after relatively long purely electric travel of the hybrid electric motor vehicle, the state of charge of the electric energy store HV can be so low that in the case of an axle hybrid all-wheel drive of the hybrid electric motor vehicle is no longer possible or is possible only to a limited extent even if all-wheel drive would be advantageous owing, for example, to the driving state on an unexpectedly slippy road covering. In this driving mode the low fuel consumption is advantageous.

In a second "standard" driving mode, only a part, for example 70% of the useable battery capacity of the electric energy store HV, is used for selecting an operating mode which is optimum in terms of fuel, i.e. for example in phases with a small requirement for the accelerator pedal the hybrid electric motor vehicle drives in a purely electric mode until the electric energy store HV still has at least 30% of its total capacity. However, the internal combustion engine VM then starts again in order to charge the electric energy store HV, for example to 100%. Therefore, 30% of the battery charge of the electric energy store HV is still reserved for the all-wheel drive. In this way, the electric energy store HV has at least 30% of its charge available at any time in order to permit all-wheel drive.

This portion is sufficient, for example, for a switched on period of approximately 10 seconds of all-wheel drive. However, the all-wheel drive is only ever actuated according to demand, i.e. when the underlying surface on which the hybrid electric motor vehicle is travelling is slippery and/or the wheels of a vehicle axle are spinning or are in a driving range with only a little traction such as is detected by a fraction controller.

During the all-wheel drive, the electric energy store HV is discharged and the remaining availability period of the all-wheel drive drops, but after the demand for all-wheel drive is eliminated again the electric energy store HV is charged again at least to such an extent that 10 seconds of all-wheel drive availability period are available again for the all-wheel drive. In this driving mode there is therefore provision for the all-wheel drive availability period to be kept at at least 10 seconds. In the "standard" driving mode the fuel consumption is somewhat higher than in the "eco" driving mode.

In a third driving mode, referred to, for example, as "prio all-wheel" mode, the electric energy store HV is fully charged as quickly as possible, and during further travel of the hybrid electric motor vehicle is no longer discharged or only discharged to a minimum extent by other electrical loads of the hybrid electric motor vehicle. For example, an additional 12-volt on-board power system can be loaded primarily by a conventional 12-volt generator or a conventional dynamo without having recourse to the energy stored in the electric energy store HV. In this driving mode, the fuel consumption can be higher than in the "standard" or "eco" driving modes but on the other hand all-wheel drive is available for a longer availability period, for example a minute, when there is demand.

In order to inform the driver about the all-wheel availability period, a display can illustrate how much all-wheel drive is available, for example with color coding of a display light or with an alphanumeric display of the estimated all-wheel availability period in seconds.

In the case of an optional fourth driving mode, designated, for example, as "force all-wheel" mode, the electric energy store HV can be charged in a way which is analogous to the charging of the electric energy store HV in the "prio all-wheel" mode. After this driving mode has been selected, the all-wheel drive is no longer selected according to demand but instead compulsorily.

A driving mode can be active by default. Alternatively, it is possible to select a driving mode only after active selection by the driver. Alternatively, a regulating device RE can select a driving mode on the basis of a driving state of the hybrid electric motor vehicle or on the basis of environmental influences which are detected by a sensor device and which influence, for example, the prevailing traction, such as, for example, precipitation or the outside temperature.

In principle, it is conceivable to use any information to define the driving mode, for example in the case of a positive gradient lying ahead of the hybrid electric motor vehicle or when travelling on an off-road section of a route an increased portion of the battery charge can be reserved for the all-wheel drive or a corresponding driving mode can be selected.

It is also conceivable to use the demand-compatible all-wheel drive in a purely electric motor vehicle if one of the axles is driven by a first electric drive unit EM1 which is configured as a main drive machine, and the other axle is driven by a second electric drive unit EM2 which is configured as an auxiliary drive.

The main drive machine is thus generally used solely for propelling the hybrid electric motor vehicle. The second electric drive unit EM2 assists the main drive machine according to demand, i.e. if the underground is slippy and the wheels of the other axle are spinning or threaten to spin.

It is to be noted that the method steps shown in FIG. 1 can be repeated in any desired fashion, for example recursively or iteratively.

Figure 2:
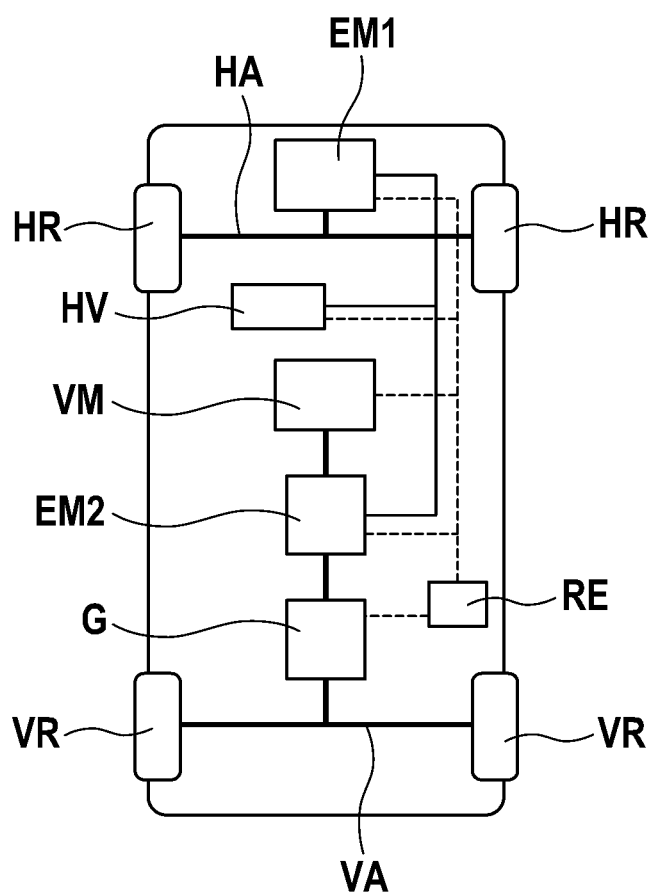
FIG. 2 shows a schematic illustration explaining a regulating device for regulating a hybrid drive of a hybrid electric motor vehicle according to a second embodiment of the present invention.

FIG. 2 shows a schematic illustration explaining a regulating device for regulating a hybrid drive of a hybrid electric motor vehicle according to a second embodiment of the present invention.

For example, the reserved portion of the battery capacity of the electric energy store HV is reserved for a motor mode of the first electric drive unit EM1.

In the case of the hybrid electric motor vehicle, a first driven vehicle axle HA is embodied which is driven by a first electric drive unit EM1. The first electric drive unit EM1 is coupled, for example, to the first driven vehicle axle HA.

The hybrid electric motor vehicle has a second driven vehicle axle VA which is driven by a second electric drive unit EM2 and by an internal combustion engine VM via a transmission device G. The internal combustion engine VM is coupled to the second driven vehicle axle VA for example via the second electric drive unit EM2 and the transmission device G.

The first driven vehicle axle HA is embodied, for example, as a rear axle and rear wheels HR are arranged thereon. The second driven vehicle axle VA is embodied, for example, as a front axle and front wheels VR are arranged thereon. The first driven vehicle axle HA and the second driven vehicle axle VA are embodied, for example, as continuously driven drive axles or as actuable drive axles of the hybrid electric motor vehicle.

The hybrid electric motor vehicle has an electric energy store HV. The electric energy store HV is embodied, for example, as a capacitor, as an accumulator, in particular as a lithium-ion accumulator, as a lithium-polymer accumulator, as a lithium-sulfur accumulator or as a lithium-iron phosphate accumulator or as another type of galvanic cell.

A regulating device RE is coupled, for example, to the transmission device G, the first electric drive unit EM1, the second electric drive unit EM2, the internal combustion engine VM, the electric energy store HV and is configured to define criteria for actuation of the first electric drive unit EM1 and/or of the internal combustion engine VM on the basis of the adjustable driving mode.

For example, an all-wheel drive of the hybrid electric motor vehicle is made possible with the first electric drive unit EM1 and the second electric drive unit EM2. Likewise, the all-wheel drive of the hybrid electric motor vehicle can be achieved by means of the internal combustion engine VM and the first electric drive unit EM1.

The regulating device RE is embodied, for example, as a stored program controller or as some other type of device which is used to perform open-loop or closed-loop control of a machine or plant and is programmed on a digital basis.

The regulating device RE is configured, for example, to process and sense one or more sensors in order to determine, by means of the sensor data, the portion of the battery capacity of the electric energy store which is to be kept in reserve. For example, data of a rain sensor, navigation data of a navigation system, data relating to vehicle parameters or other data are processed as sensor data by the regulating device RE, from which data a future demand for traction by the hybrid electric motor vehicle can be determined.

For example, when the windshield wiper is operating at the lowest level the regulating device RE of the hybrid electric motor vehicle could reserve a portion of the battery capacity which is sufficient for 10 seconds of all-wheel drive, when the windshield wiper is operating at the maximum level it could reserve a portion of the battery capacity which is sufficient for 20 seconds of all-wheel drive, and in the case of a prevailing outside temperature of below +5° C. it could reserve a portion of the battery capacity which is sufficient for 30 seconds of all-wheel drive.

Figure 3:
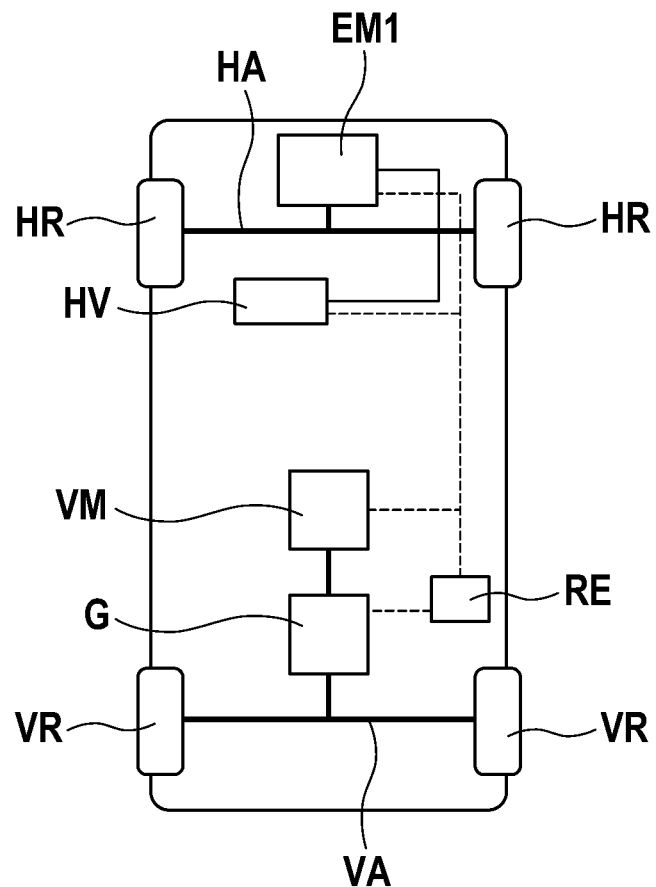
FIG. 3 shows a schematic illustration explaining a regulating device for regulating a hybrid drive of a hybrid electric motor vehicle according to a third embodiment of the present invention.

FIG. 3 shows a schematic illustration explaining a regulating device for regulating a hybrid drive of a hybrid electric motor vehicle according to a third embodiment of the present invention.

The electric drive of the hybrid electric motor vehicle can comprise the first electric drive unit EM1 and/or the second electric drive unit EM2. FIG. 3 illustrates an exemplary embodiment with just one electric drive unit EM1 as the electric drive.

The method according to the invention permits temporary all-wheel drive to be made available with sufficiently long times of use since a percentage of 0 percent or of up to 30 percent or of up to 70 percent or of up to 100 percent of the battery capacity of the electric energy store HV is reserved for the temporary all-wheel drive, with the result that a second electric drive unit EM2 which is operated as a generator during the all-wheel drive is not necessary. This permits a cost-effective implementation of the drive of the hybrid electric motor vehicle.

FIGS. 2 and 3 do not show pulse-controlled inverters or inverters or other devices for inverting the direct voltage which is made available by the electric energy store HV into the alternating voltage which is required by the electric drive units EM1, EM2.

For example, each of the electric drive units EM1, EM2 requires in each case a pulse-controlled inverter and in each case one or more electric machines which convert electrical energy into mechanical energy.

However, it is also conceivable to provide pulse-controlled inverters or inverters or other devices for converting the direct voltage in a spatially separated fashion from the electric drive units EM1, EM2.

The further reference symbols which are used in FIG. 3 are already explained in the description of FIG. 2.

Although the present invention has been described on the basis of preferred exemplary embodiments, it is not restricted thereto. In particular, the specified embodiments and the method sequences are only exemplary and are not restricted to the explained examples. The described refinements and developments can, where appropriate, be combined with one another as desired.

The invention claimed is:

1. A method for regulating a hybrid drive of a hybrid electric motor vehicle which has an electric energy store (HV), having the steps:
    defining (S1) criteria for actuating an electric drive (EM1; EM1, EM2) and/or an internal combustion engine (VM) of the hybrid electric motor vehicle on the basis of an adjustable driving mode, wherein a portion of a battery capacity of the electric energy store (HV) is reserved by means of a variable setting; and
    regulating (S2) actuation of the electric drive (EM1; EM1, EM2) and/or of the internal combustion engine (VM) of the hybrid electric motor vehicle by means of the defined criteria and by means of the variable setting; and
    wherein a demand, determined by a sensor device, for an increase in traction of the hybrid electric motor vehicle is used as one of the criteria for the actuation of the electric drive (EM1; EM1, EM2) and/or of the internal combustion engine (VM), and
    wherein availability of all-wheel drive is indicated on the basis of the reserved portion of the battery capacity of the electric energy store (HV).

2. The method as claimed in claim 1, wherein the electric drive (EM1; EM1, EM2) of the hybrid electric motor vehicle is configured as an actuable electric drive which permits all-wheel drive of the hybrid electric motor vehicle.

3. The method as claimed in claim 1, wherein the adjustable driving mode is selected from a plurality of driving modes by the driver.

4. The method as claimed in claim 1, wherein between zero percent and 30 percent of the battery capacity of the electric energy store (HV) is used as the portion of the battery capacity of the electric energy store (HV) which is reserved for a motor mode of a first electric drive unit (EM1) and/or of a second electric drive unit (EM2).

5. The method as claimed in claim 1, wherein the adjustable driving mode forcibly brings about a motor mode of a first electric drive unit (EM1).

6. The method as claimed in claim 1, wherein the availability of all-wheel drive is displayed and an anticipated availability period of the all-wheel drive is also displayed.

7. The method as claimed in claim 1, wherein the electric drive (EM1; EM1, EM2) has only one electric drive unit (EM1).

8. The method as claimed in claim 1, wherein the portion of the battery capacity of the electric energy store (HV) which is to be reserved is determined on the basis of sensor data.

9. A regulating device for regulating a hybrid drive of a hybrid electric motor vehicle which has an electric energy store (HV), wherein the regulating device is configured:
    to define criteria for actuating an electric drive (EM1; EM1, EM2) and/or an internal combustion engine (VM) of the hybrid electric motor vehicle on the basis of an adjustable driving mode, wherein a portion of a battery capacity of the electric energy store (HV) is reserved by means of a variable setting; and
    to regulate actuation of the electric drive (EM1; EM1, EM2) and/or of the internal combustion engine (VM) of the hybrid electric motor vehicle by means of the defined criteria and by means of the variable setting; and
    wherein a demand, determined by a sensor device, for an increase in traction of the hybrid electric motor vehicle is used as one of the criteria for the actuation of the electric drive (EM1; EM1, EM2) and/or of the internal combustion engine (VM)), and
    wherein availability of all-wheel drive is indicated on the basis of the reserved portion of the battery capacity of the electric energy store (HV).

10. The method as claimed in claim 1, wherein between zero percent and 70 percent of the battery capacity of the electric energy store (HV) is used as the portion of the battery capacity of the electric energy store (HV) which is reserved for a motor mode of a first electric drive unit (EM1) and/or of a second electric drive unit (EM2).

11. The method as claimed in claim 1, wherein between zero percent and 100 percent of the battery capacity of the electric energy store (HV) is used as the portion of the battery capacity of the electric energy store (HV) which is reserved for a motor mode of a first electric drive unit (EM1) and/or of a second electric drive unit (EM2).

* * * * *